United States Patent [19]

Council

[11] Patent Number: 4,575,855
[45] Date of Patent: Mar. 11, 1986

[54] RING LASER GYRO CATHODE ARRANGEMENT

[75] Inventor: Thomas Council, Camarillo, Calif.

[73] Assignee: Sundstrand Optical Technologies, Inc., Newbury Park, Calif.

[21] Appl. No.: 518,342

[22] Filed: Jul. 29, 1983

[51] Int. Cl.[4] .............................................. H01S 3/097
[52] U.S. Cl. ....................................... 372/87; 372/94; 356/350
[58] Field of Search ............................ 372/87, 93, 94; 356/350

[56] References Cited

U.S. PATENT DOCUMENTS 3,390,606  7/1968  Podgorski ............................ 372/94
4,007,431  2/1977  Abbink et al. ........................ 372/94

Primary Examiner—William L. Sikes
Assistant Examiner—Léon Scott, Jr.
Attorney, Agent, or Firm—Wood, Dalton, Phillips, Mason & Rowe

[57] ABSTRACT

A cathode arrangement for a ring laser gyro. A metal cathode member is sunken into a bore disposed in the gyro body to provide a low profile cathode arrangement. An annular groove is formed at the bottom of the bore around the periphery thereof. The cathode member is suspended from a cover such that the lower edge of the cathode member is disposed in the annular groove, the cover being secured to the gyro body to provide a seal therebetween.

11 Claims, 2 Drawing Figures

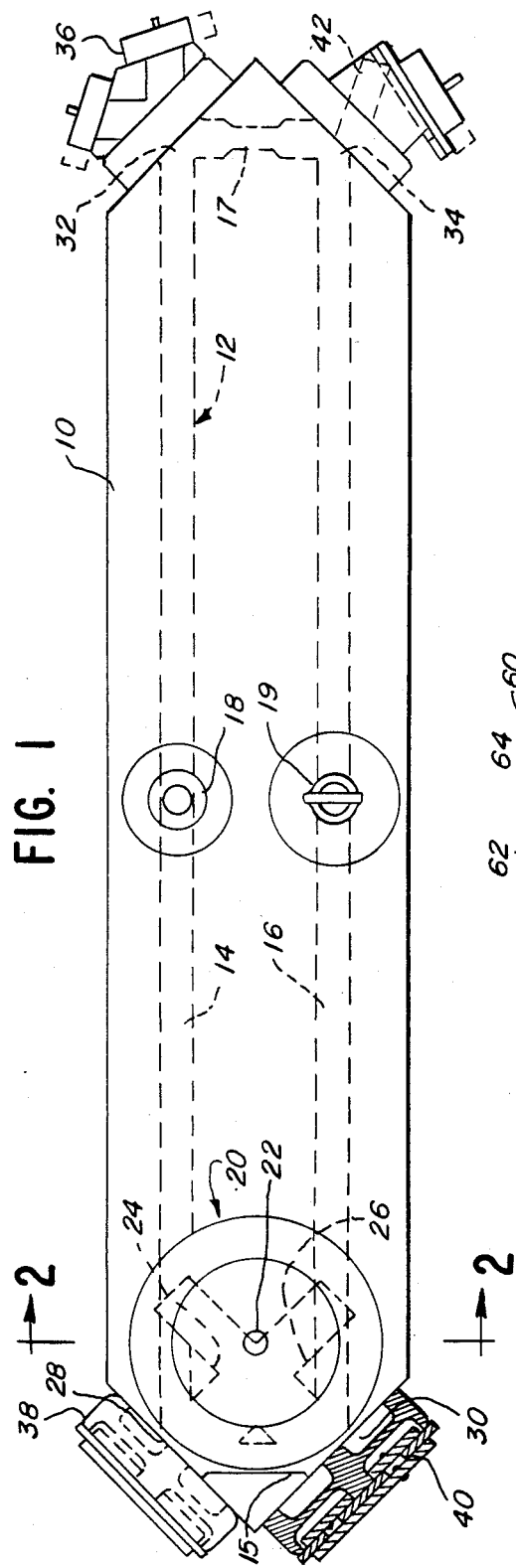
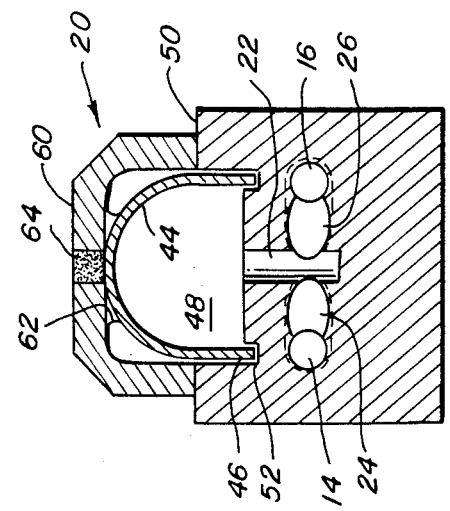

RING LASER GYRO CATHODE ARRANGEMENT

TECHNICAL FIELD

The present invention relates to a cathode arrangement for a ring laser gyro and more particularly to a low profile cathode arrangement wherein the cathode is sunken into the body of the gyro.

BACKGROUND OF THE ART

Typical ring laser gyros include a cavity disposed within a solid gyro body, the cavity forming a closed loop path. The gyro further includes a cathode and a pair of anodes, each of which is in communication with the cavity. Suitable means are provided for establishing a gas discharge between the cathode and each of the anodes so as to generate a pair of counter-rotating laser beams traveling through the cavity.

Known cathode arrangements for ring laser gyros have included a metal cathode member having a substantially semi-spherical outer surface. About the periphery of the lower edge of the cathode member, an outwardly extending metal flange is typically provided for securing the cathode member to an upper surface of the gyro body. The metal flange of the cathode member is typically secured to the quartz body of the ring laser gyro by means of an indium seal. The metal to glass seal often fails due to stresses therein caused by changes in temperature and the like. Therefore, such cathode arrangements have a very limited life. Another problem with known cathode arrangements is cathode sputtering wherein a discharge between the cathode and anodes results in ions bombarding the metal cathode member causing an ejection of atoms from the surface thereof, the sputtering typically occurring around sharp corners of the member such as near the flange. Further, because the metal cathode member is seated on the upper surface of the ring laser gyro body, the cathode arrangement has a high profile adding to the overall height of the gyro. In applications where the size of the gyro must be minimized, such known cathode arrangements are undesirable.

DISCLOSURE OF THE INVENTION

In accordance with the present invention, the disadvantages of prior cathode arrangements for ring laser gyros as discussed above have been overcome. The cathode arrangement of the present invention employs a full size metal cathode member which is sunken into a bore in the body of a ring laser gyro so as to provide a very low profile.

In the cathode arrangement of the present invention, the body of the ring laser gyro is provided with an annular groove disposed at the bottom of the bore around the periphery thereof. The periphery of the cathode member at the lower edge is flat, the flange of the prior art having been eliminated so that the lower edge of the cathode member may be disposed within the annular groove. A cover is further provided which extends about the cathode member and which is secured to the gyro body, forming a seal therebetween. The cathode member at its upper end is secured to the cover and supported thereby such that the lower edge of the member is suspended in the annular groove of the gyro body.

The annular groove and configuration of the metal cathode member eliminate sputtering at the cathode edge. Further, because the metal cathode member is suspended by the cover, eliminating the metal to glass seal between the cathode member and gyro body, the cathode arrangement of the present invention has an increased life.

These and other objects and advantages of the invention, as well as details of an illustrative embodiment, will be more fully understood from the following description and the drawings.

BRIEF DESCRIPTION OF THE DRAWINGS

FIG. 1 is a top view of a cross-section of a ring laser gyro including the cathode arrangement of the present invention;

FIG. 2 is a cross-section of the cathode arrangement taken along lines 2—2 of FIG. 1.

BEST MODE FOR CARRYING OUT THE INVENTION

The ring laser gyro shown in FIG. 1 includes a body 10, which may be made of quartz, having a cavity 12 therein forming a closed loop path. The cavity 12 has a polygonal shape formed by intersecting gain tubes 14–17. The ring laser gyro includes a pair of anodes 18 and 19, each of which is in communication with a respective gain tube 14, 16 of the cavity 12. The ring laser gyro also includes a cathode generally designated 20. A bore 22, extending downward into the gyro body, provides communication between the cathode 20 and the cavity 12 through a pair of connecting bores 24 and 26. The cavity 12 contains a gas or gases suitable for laser operation, such as 90% helium and 10% neon, at a pressure of 3 torr. A suitable electrical excitation source connected between the cathode 20 and anodes 18 and 19 may be provided to establish a gas discharge between the cathode and anodes to produce two counter-rotating laser beams.

The counter-rotating laser beams are reflected around the closed loop path formed by the cavity 12 by mirrors 28–34 positioned at the corners of the cavity. As the gyro is rotated, the effective path length for one beam is increased while the effective path length for the other beam is decreased due to Doppler shifting. A beat frequency which is proportional to the rate of rotation is produced in response to heterodyning of the two beams such as by means of a prism associated with the mirror 32. The beat frequency produces a fringe pattern which is detected by a dual photodiode 36 providing the output of the gyro. As shown in FIG. 1, the mirrors 28 and 30 may be diaphragm mirrors including respective drivers 38 and 40 which vibrate the mirrors periodically in a direction perpendicular to the mirror face. The mirrors 28 and 30 are driven 180° out of phase so as to maintain the path length of the cavity 12 constant. Each of the mirror drivers 38 and 40 is responsive to the output of a single photodiode 42 associated with the mirror 34, the photodiode monitoring the intensity of the laser beams and providing an output to the dithered mirrors so that the beams are maintained at mode center. Details of the two dithered mirrors and a control circuit for maintaining the 180° phase relationship are disclosed in a copending patent application, Ser. No. 462,548 assigned to the assignee of this application.

The cathode 20 as shown in detail in FIG. 2 includes a metal cathode member 44 having a hollow, substantially semi-spherical shape wherein the periphery of the cathode member at the lower edge 46 thereof is flat. The body 10 of the ring laser gyro includes a bore 48 extending from an upper surface 50 down into the body 10 of the gyro. An annular groove 52 is further provided at the bottom of the bore 48, the groove extending about the periphery of the bore and having the lower edge 46 of the metal cathode member 44 disposed therein. The bore 48 and annular groove 52 allow the cathode member to be sunken into the gyro body. The resulting low profile cathode arrangement allows the overall height of the gyro to be minimized.

The cathode arrangement further includes a glass cover 60 extending about the cathode member 44 and epoxied to the upper surface 50 of the gyro body 10 to provide a seal therebetween. The metal cathode member 44 is attached to the cover by an indium seal 62 and is supported by the cover such that the lower edge 46 of the member 44 is suspended in the annular groove 52. The configuration of the lower edge 46 of the cathode member 44, and the annular groove 52 in which the cathode member is suspended, substantially eliminates sputtering at the cathode edge. Further, because the metal cathode member 44 is not directly sealed to the quartz body 10 of the ring laser gyro, the fatigue life of the cathode arrangement is substantially increased over those cathode arrangements wherein the metal cathode member is secured directly to the gyro body.

The cover 60 is provided with a centrally located aperture 64 to permit electrical contact with the cathode member 44. The indium 62 extends between the cover 60 and member 44, around the aperture 64 to provide an effective seal.

I claim:

1. In a ring laser gyro having a body with a cavity therein forming a closed loop path, a cathode and a pair of anodes, each of which is in communication with said cavity and means for establishing a gas discharge between said cathode and each of said anodes to provide a pair of counter-rotating beams traveling through said cavity, an improved cathode arrangement comprising:
   a metal cathode member having a lower edge;
   an annular groove in a surface of the gyro body, the lower edge of said cathode member being disposed within said groove; and
   a cover extending about the cathode member and secured to said gyro body, said cover supporting the cathode member.

2. The cathode arrangement of claim 1 wherein said cathode member at an upper end is secured to said cover and supported thereby such that the lower edge of said cathode member is suspended in said annular groove.

3. The cathode arrangement of claim 1 wherein the gyro body has a bore in said surface, said annular groove being disposed at the bottom of said bore around the periphery thereof so as to be sunken into the gyro body.

4. The cathode arrangement of claim 1 wherein said cover is secured to the gyro body to provide a seal therebetween.

5. The cathode arrangement of claim 1 wherein said cover is made of glass and the cathode member is secured to said cover by means of an indium seal.

6. The cathode arrangement of claim 1 wherein said cover has an aperture to allow access to said cathode member and further including a seal between said cover and cathode member, said seal extending about said aperture.

7. In a ring laser gyro having a body with a cavity therein forming a closed loop path, a cathode and a pair of anodes, each of which is in communication with said cavity and means for establishing a gas discharge between said cathode and each of said anodes to provide a pair of counter-rotating beams traveling through said cavity, an improved cathode arrangement comprising:
   a metal cathode member;
   said gyro body having a bore disposed in a surface thereof; and
   means secured to the gyro body for supporting said cathode member in said bore, said cathode member being sunk into the gyro body to provide a low profile cathode arrangement.

8. The cathode arrangement of claim 7 wherein said cathode member is suspended in said bore by said supporting means.

9. The cathode arrangement of claim 8 wherein said supporting means forms a cover extending about the cathode member and is sealed to the gyro body.

10. The cathode arrangement of claim 7 wherein said gyro body has an annular groove extending about the periphery of said bore, a lower edge of said cathode member being disposed within said groove.

11. In a ring laser gyro having a body with a cavity therein forming a closed loop path, a cathode and a pair of anodes, each of which is in communication with said cavity and means for establishing a gas discharge between said cathode and each of said anodes to provide a pair of counter-rotating beams traveling through said cavity, an improved cathode arrangement comprising:
   a metal cathode member having a lower edge;
   said gyro body having a bore disposed in a surface thereof and having an annular groove extending around the periphery of the bottom of said bore, the lower edge of said cathode member being disposed within said groove to prevent cathode sputtering.

* * * * *